Nov. 2, 1965 C. F. KRUGER ETAL 3,215,873
MOTOR PROTECTIVE MEANS
Filed May 27, 1960 2 Sheets-Sheet 1
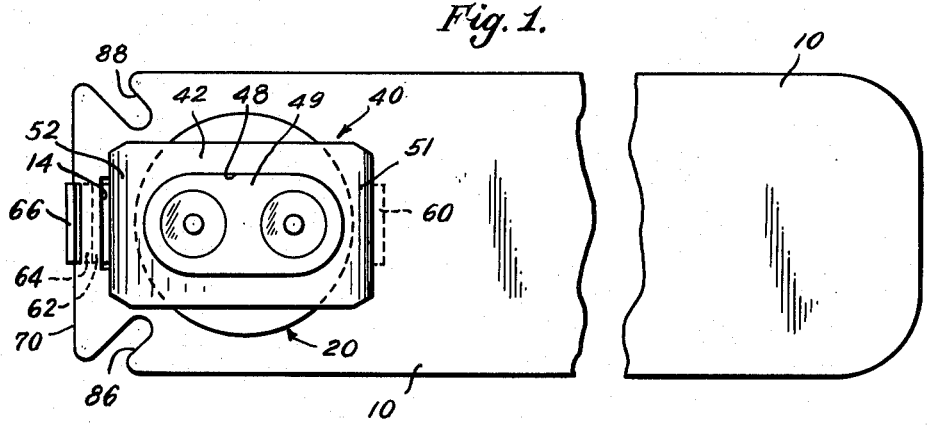
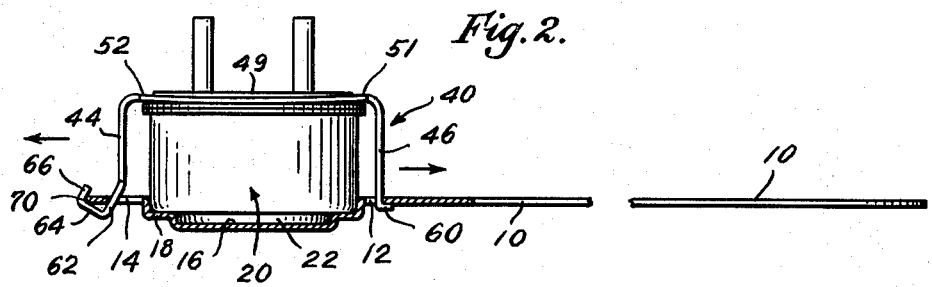
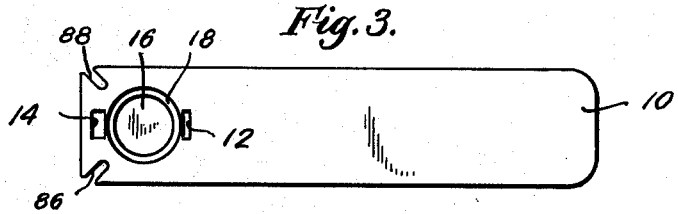
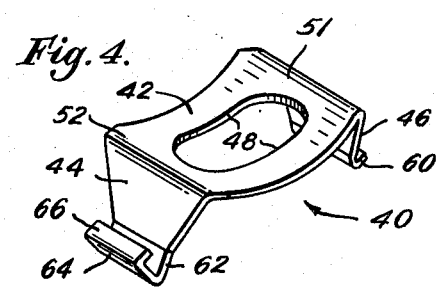
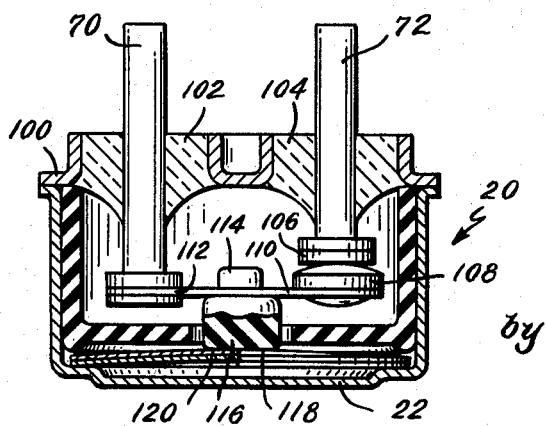
Inventors:
Curtis F. Kruger,
Harry F. Rice, Jr.,
by Harold Levine
Atty.

Inventors:
Curtis F. Kruger,
Harry F. Rice, Jr.,
by Harold Levine Att'y.

United States Patent Office 3,215,873
Patented Nov. 2, 1965

3,215,873
MOTOR PROTECTIVE MEANS
Curtis F. Kruger, Attleboro, and Harry F. Rice, Jr., Plainville, Mass., assignors to Texas Instruments Incorporated, Dallas, Tex., a corporation of Delaware
Filed May 27, 1960, Ser. No. 32,272
2 Claims. (Cl. 310—68)

The present invention relates to motor protective means, and is more particularly concerned with improved means for protecting motors against abnormally high temperatures caused by excessive current conditions or in the loss of heat removal from the windings thereof.

It is one object of the instant invention to provide a simple, low-cost and convenient means for detachably mounting a thermally responsive switching device in intimate thermal juxtaposition with the part or parts of an electric motor to be protected.

It is another object of the instant invention to provide a means for mounting a thermally responsive protector, which means includes one part which is adapted to be installed into the motor at the time of assembly of the motor or stator, and the other parts of which can be assembled into opeartive position at a later convenient time.

Among the further several objects of the invention may be noted the provision of a low-cost, rapidly producible means for mounting protective devices such as those which employ a thermally responsive device in the form of a bimetallic element; the provision of such means which permit a rapid mounting without the use of separate rivets, screws or like fasteners, brazing, welding or other operations; and which detachably and rigidly mount the thermal protector in close thermal juxtaposition with the part or parts of the motor to be protected.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accomanying drawings, in which one of the various possible embodiments of the invention is illustrated:

FIG. 1 is a top plan view of one embodiment of the instant invention;

FIG. 2 is a side elevation of the construction shown in FIG 1;

FIG. 3 is a top plan view of a thermally conductive strap, omitting the thermally protective device and clip for purposes of clarity of illustration;

FIG. 4 is a perspective view illustrating a spring clip according to the instant invention;

FIG. 5 is a sectional elevational view of an exemplary thermally responsive switch means which may be employed in the practice of the present invention.

Similar reference characters indicate corresponding parts throughout the several views of the drawings.

Figure 6:
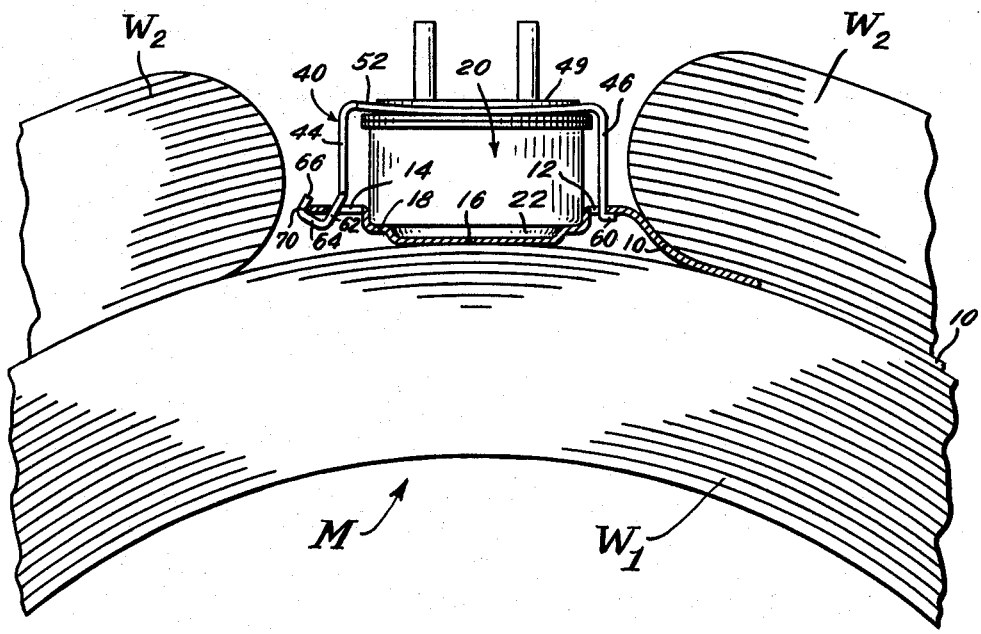
FIG. 6 is a fragmentary elevational view of the windings of a motor illustrating a typical installation of the thermally conductive strap interleaved between the motor windings.

In protecting the windings of electric motors with thermally responsive switching devices, it is desirable that the thermally responsive switching device be located in close thermal juxtaposition with the winding, windings or parts to be protected so as to respond directly to the temperature changes of such winding or windings. It has been known to employ a thermally conductive strap member which may be interleaved between the windings of a motor and to weld, solder or braze the thermally protective device to such strap. Such a prior arrangement is shown in U.S. Patent No. 2,909,719 to Dubberley, which issued on October 20, 1959. Such straps and motor protectors welded or brazed thereto are generally built into or assembled with the motor parts at the time of manufacture or assembly of the motor. Insertion of a strap and motor protector at the time of making the motor complicates assembly of the motor and requires a costly and cumbersome extra operation to install the switch and thermally conductive strap at this time. Further, with windings which have to be subjected to considerable pressures for blocking, there is a possibility of damaging the thermal protector during the manufacturing of the motor and/or in transporting the motor to the location of assembly of the motor into, for example, a compressor etc. Such damage to the motor protector might involve changing the operating characteristics of the device and/or decreasing the quality of a hermetic seal where the protective switching device is required to be hermetically sealed. Further, the necessity for welding, brazing or soldering of the thermostat to the thermal conductor is a costly and cumbersome operation. The present invention obviates these problems and additionally affords other advantages, as will be apparent as the description proceeds.

Referring now to the drawings, in FIG. 1 is shown a thermally conductive strap or member 10 which may be formed, for example, of copper or some other suitably thermally conducting material. Strap 10 is adapted to be inserted between the windings of a motor or adjacent parts thereof to be protected and whose temperature is to be sensed by a thermally responsive protector. Strap 10 may be mounted between the windings of a motor, for example, in the manner shown in the Dubberley patent referred to above, or as shown in FIG. 6, strap 10 is interleaved between the windings W and W' of a motor generally designated by letter M. Starp 10 is provided with two recessed portions 86 and 88 which are adapted to facilitate mounting of the strap in the windings or other parts of the motor to be protected.

Referring now to FIG. 3, strap 10 is provided with two spaced substantially rectangular openings 12 and 14, adjacent one end thereof. Opening 14 is substantially larger than opening 12 to accommodate passage therethrough of a locking tab portion of a spring clip to be described below. Strap 10 is also provided with a pair of spaced, concentric annular shaped shoulder seating portions 16 and 18, as best seen in FIGS. 2 and 3. Portions 16 and 18 define a depressed seating pocket to accommodate and seat a thermally responsive switch device 20 having a correspondingly shaped bottom casing portion. Portions 16 and 18 mate and co-operate with the two-step exterior configuration of the bottom part of the casing 22 of switch 20, as best seen in FIGS. 2 and 5, to advantageously afford good physical and thermal contact therebetween.

Electrical switch 20 is maintained in good physical and thermal contact with strap 10 by means of a detachable spring clip generally referred to by numeral 40. Spring clip 40 is conveniently made of spring steel or other suitable material. As best seen in FIG. 4, spring clip 40 includes a main or central body portion 42 and legs 44 and 46 integral therewith and extending transversely thereto. The upper part of the main body portion 42 of clip 40 is provided with an aperture 48 which is adapted to receive a raised shoulder or boss portion 49 provided by switch 20. Although aperture 48 is shown as being substantially elliptical in shape, it should be understood that this aperture may take any form which will be complementary to the shape of the projection provided by the thermally responsive switch member 20.

Main body portion 42, as shown in FIG. 4, is concave in shape with the ends 51 and 52 thereof respectively adjacent legs 46 and 44, extending upwardly from the center of said main body portion 42. Legs 44 and 46 are spring biased in a direction away from each other, as shown by the arrows in FIG. 2. Ends 51 and 52 of main body portion 42 respectively adjacent legs 46 and 44 are spring biased upwardly, as seen in FIG. 4. Leg 46 is provided, at its free end, with a bent or tab portion 60 which extends substantially at right angles thereto. Leg 44 has integral therewith, a bent leg portion 62 adjacent its lower end. Bent leg portion 62 has formed integrally therewith a bent tab portion 64 substantially at right angles to portion 62. Integrally formed with tab portion 64 is a lip portion 66 which extends substantially at right angles to tab portion 64, as best seen in FIGS. 2 and 4. Bent leg portion 62, bent tab portion 64 and lip portion 66 form a J-shaped latching member which is adapted to pass through aperture 14 in strap 10 and latch to strap 10 in the manner clearly shown in FIG. 2. The spring bias on legs 44 and 46 will maintain the latter and their respective latching tab portions in firm engagement with the respective surfaces of strap 10, as shown in FIG. 2.

The spring clip 40's unique configuration is such that, although it provides the numerous advantages mentioned above and to be mentioned below, it does not interfere with the electrical spacing of the thermostat terminals 70 and 72. No additional height is added to the thermostat 20, thermal conductor strap 10 assembly by the clip. Portions 16 and 18 of strap 10, in addition to providing intimate physical contact between the thermostat and the conductor strap for good heat transfer, also advantageously serve to locate and orient the thermostat with respect to the conductor strap.

Clip member 40 is adapted to detachably secure thermally responsive switch 20 to strap 10 quickly and easily in the following manner:

(1) Insert leg 46 through aperture 12 in strap 10 so that tab 60 engages the underside of strap 10, as shown in FIG. 2.

(2) Place the main body portion 42 over the thermally responsive switch 20 so that aperture 48 receives raised boss or projection 49 on thermostat 20.

(3) Depress spring leg 44 inwardly toward leg 46 against its bias, in a direction opposite to that of the arrows shown in FIGS. 2 and 4, so that bent leg portion 62, tab 64 and lip 66 extend through hole 14 in strap 10.

(4) After the leg 62, tab 64 and lip 66 have passed through the hole 14 to below the surface of strap 10, release leg 44 and it will quickly snap into place, with lip 66 engaging the free end surface 70 of strap 10, as shown in FIG. 2.

Clip 40, when in place about thermostat 20 and strap 10, is effective to lock and maintain thermostat 20 in good physical and thermal contact with the strap 10. Further, the engagement of aperture 48 with the raised boss portion 49 of the thermostat 20 is effective to prevent rotation of thermostat 20 in the seating pocket defined by portions 16 and 18 and serves to orient the parts for proper assembly and prevent deleterious dislocation of electrically spaced adjacent parts. When the spring clip 40 is in fixed operative position, as shown in FIG. 2, the main body portion 42 will be deformed, with edges 51 and 52 maintained in a stressed downward position by lip 60 of leg 46 and portions 62, 64 and 66 of leg 44 whereby the central body portion 42 exerts a substantially downward force against thermostat 20, urging the latter into firm physical and thermal contact with the strap.

Legs 46 and 44, which are spring biased in a direction away from each other, as shown in the arrows in FIGS. 2 and 4, advantageously urge the legs into engagement with the strap 10 when in assembled condition, as shown in FIG. 2, and not only serve to firmly mount the thermostat 20 in intimate thermal contact with strap 10, but also minimize vibration and obviate the possibilities of unintentional dislodgment.

Quick removal of the spring clip 40 and the thermostat 20 from the strap 10 can easily be effected from the locked position shown in FIG. 2 merely by reversing the steps outlined above.

Referring now to FIG. 5, there is illustrated in cross sectional elevation, a typical exemplary thermally responsive switch 20, such as might be employed in the practice of the instant invention. Switch 20 includes a thermally conductive outer casing member 22 having the two-step exterior bottom configuration, as discussed above. Switch 20 also includes a cover or header member 100, which mounts two electrically conducting terminals 70 and 72, in a conventional glass-to-metal hermetic seal, the glass seals being indicated at 102 and 104. Terminal 70 carries a stationary electrical contact 106 at its inner end, as shown. Stationary contact 106 is adapted to mate with a movable contact 108 carried by an electrically conducting spring arm 110 which is cantilever mounted and fixed at its other end 112 to terminal 70, as shown. Cantilever mounted contact-carrying spring arm 110 is provided with an aperture which receives an upstanding projection 114 of a motion transfer member 116. Motion transfer member 116 is engageable at its free end 118 with a snap-acting, thermally responsive disc 120. Disc 120 is a thermostatic snap-acting disc of the type shown in the J. A. Spencer Patent No. 1,448,240 and of the type shown in U.S. Patent Nos. 2,667,553 and 2,752,454. The operation of this device is such that when disc 120 is heated, it snaps to a position which is convex in one direction and upon cooling, it snaps back to its former position which is convex in the other direction. The disc 120 engages the motion transfer pin 116 in the position shown in FIG. 5 to urge spring member 110 upwardly into the contacts-closed position. As the disc snaps from the convex position shown in FIG. 5 to a convex position of opposite configuration, motion transfer member 116 and spring member 110, which is biased for movement in a contacts-opening direction, will move downwardly to open contacts 106 and 108.

From the above, it can be seen that strap 10 can easily and conveniently be inserted into the motor at the time of making or assembly of the motor, and thermally responsive switching device 20 can be detachably mounted on the strap in the manner described above, as shown in FIG. 6, at any convenient time, either before or after completion of the motor. Further, if the switch were installed with the motor at the time of making thereof, it would be extremely difficult, if not possible, in many cases to replace the protector where necessary. The instant invention permits quick and easy removal of the motor protector for replacement or servicing of the motor. It should be noted that the spring clip 40 also provides a thermally conductive path to the protector 20 from strap 10. Spring clip 40 thus serves the multiple functions of mechanically securing the protector 20 to the strap 10 in intimate physical and thermally conductive contact therewith, as well as increasing the thermal intimacy therebetween by providing the additional thermally conductive path described above.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the image is capable of other embodiments and of being practiced or carried out in various ways. Also it is to be understood that the phraseology or terminology employed herein is for the purpose of description and not of limitation.

We claim:

1. In combination: a thermally conductive strap member adapted to be mounted in thermally conducting relation with a part of an electric motor whose temperature is to be sensed; a portion of said strap member being deformed and configured for receiving and mating a correspondingly configured portion of a thermally responsive switching device; said deformed portion of said strap member receiving and seating asid correspondingly configured portion of said switching device in intmate thermally conductive relation therewith; said strap member providing a pair of spaced apertures; said deformed portion of said strap members being intermediate said apertures; spring clip means engageable with said switching device; said spring clip means comprising a main body portion spring biased to a concave configuration; said main body having a leg at each of two opposite ends thereof formed integrally therewith and extending at an angle thereto; said legs being opposed and biased for movement in a direction away from each other; each of said legs including at its free end thereof a bent tab portion extending outwardly thereof; each of said bent tab portions being adapted to be received in a respective one of said spaced pair of apertures and engageable with at least one surface of said strap member to detachably and rigidly secure said thermally responsive switch to said strap member in thermally conductive relationship therewith.

2. In combination: a motor having a plurality of windings; a thermally conductive metallic strip mounted in heat exchange relationship with at least one of said windings; a portion of said strip member being deformed and configured to receive and mate with a correspondingly configured portion of a thermally responsive switching device; said strip providing a pair of opposed spaced apertures, one on either side of said deformed and configured portion of said strip member; a thermally responsive electrical switching device having a portion configured corresponding to said deformed and configured strip portion, said portion of the swictching device received and seated in said deformed and configured portion of said strip member in intimate thermally conuctive relation therewith; spring clip means engageable with said switching device and said strip to maintain said switch in intimate thermally conductive relation with said strip member; said spring clip means comprising a main body portion; a leg member secured to each of two opposed ends thereof; said legs being integral with said main body portion and being opposed to each other and spring biased for movement in a direction away from each other; each of said legs being provided at the free end thereof with bent tab latching portions extending at an angle to said legs and in a direction away from each other; said bent tab portions and leg each adapted to be received within a respective aperture in said strip and to detachably mount said thermally responsive electrical switching device to said strip whereby said switching device is in thermal juxtaposition with said one winding of said motor and heat is conducted to the switching device through the seating portion of the strip and through the clip.

References Cited by the Examiner

UNITED STATES PATENTS

| 1,947,078 | 2/34 | Cobb | 310—68.3 |
| 2,369,986 | 2/45 | Schaefer | 310—68.3 X |
| 2,885,905 | 5/59 | Larkin | 200—168 X |
| 2,893,671 | 7/59 | Flora et al. | 248—361 |
| 2,907,852 | 10/59 | Long et al. | 200—168 X |
| 2,909,719 | 10/59 | Dubberley | 310—68.3 |
| 2,921,147 | 1/60 | Hutt | 200—168 X |

FOREIGN PATENTS

| 835,191 | 5/60 | Great Britain. |

MILTON O. HIRSHFIELD, *Primary Examiner.*